(12) United States Patent
Kamm et al.

(10) Patent No.: US 7,645,207 B2
(45) Date of Patent: Jan. 12, 2010

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 329 days.

(21) Appl. No.: 11/724,388

(22) Filed: Mar. 15, 2007

(65) Prior Publication Data

US 2007/0232438 A1    Oct. 4, 2007

(30) Foreign Application Priority Data

Mar. 30, 2006    (DE) .................... 10 2006 014 755

(51) Int. Cl.
*F16H 3/62*    (2006.01)
(52) U.S. Cl. ...................................... 475/275
(58) Field of Classification Search ................. 475/275
See application file for complete search history.

(56) References Cited

U.S. PATENT DOCUMENTS

| | | | |
|---|---|---|---|
| 4,038,888 A * | 8/1977 | Murakami et al. | 475/276 |
| 6,176,803 B1 | 1/2001 | Meyer et al. | |
| 6,634,980 B1 | 10/2003 | Ziemer | |
| 6,960,149 B2 | 11/2005 | Ziemer | |
| 7,014,589 B2 | 3/2006 | Stevenson | |
| 7,018,319 B2 | 3/2006 | Ziemer | |
| 7,204,780 B2 * | 4/2007 | Klemen | 475/279 |
| 7,285,069 B2 * | 10/2007 | Klemen | 475/275 |
| 7,311,635 B2 * | 12/2007 | Klemen | 475/286 |

FOREIGN PATENT DOCUMENTS

| | | |
|---|---|---|
| DE | 42 34 572 A1 | 4/1994 |
| DE | 199 49 507 A1 | 4/2001 |
| DE | 100 83 202 T1 | 1/2002 |
| DE | 101 15 983 A1 | 10/2002 |
| DE | 101 15 995 A1 | 10/2002 |
| DE | 10 2004 029 952 A1 | 1/2005 |
| DE | 10 2005 002 337 A1 | 8/2006 |
| DE | 10 2005 032 001 A1 | 2/2007 |

* cited by examiner

*Primary Examiner*—Ha D. Ho
(74) *Attorney, Agent, or Firm*—Davis & Bujold, P.L.L.C.

(57) ABSTRACT

An eight gear transmission having drive and output shafts, planetary gearsets, shafts and shifting elements. One carrier of the gearset (RS4) and the drive shaft are coupled to form shaft (1). One ring gear of the gearset (RS2), one carrier of the gearset (RS3) and the output shaft are coupled to form shaft (2). One sun gear of the gearset (RS1) and one sun gear of the gearset (RS4) are coupled to form shaft (3). One carrier of the gearset (RS1) forms shaft (4). One sun gear of the gearset (RS3) forms the fifth shaft. One ring gear of the gearset (RS1) and one carrier of the gearset (RS2) and one ring gear of the gearset (RS3) are coupled to form shaft (6). One ring gear of the gearset (RS4) forms the seventh shaft. One sun gear of the gearset (RS2) forms shaft (8).

33 Claims, 4 Drawing Sheets

| Gear | Engaged Shifting Elements | | | | | Ratio i | Step φ |
|---|---|---|---|---|---|---|---|
| | Brake | | Clutch | | | | |
| | A | B | C | D | E | | |
| 1 | ● | ● | ● | | | 4.40 | |
| 2 | ● | ● | | | ● | 3.21 | 1.37 |
| 3 | | ● | ● | | ● | 2.23 | 1.44 |
| 4 | | ● | | ● | ● | 1.68 | 1.33 |
| 5 | | ● | ● | ● | | 1.30 | 1.29 |
| 6 | | | ● | ● | ● | 1.00 | 1.30 |
| 7 | ● | | ● | ● | | 0.87 | 1.16 |
| 8 | ● | | | ● | ● | 0.73 | 1.19 |
| R | ● | ● | | ● | | -2.70 | TOTAL 6.03 |

Fig. 2

MULTI-SPEED TRANSMISSION

This application claims priority from German Application Serial No. 10 2006 014 755.3 filed Mar. 30, 2006.

FIELD OF THE INVENTION

The present invention relates to a multi-speed transmission in planetary design, particularly an automatic transmission for a motor vehicle, comprising one drive shaft, one output shaft, four planetary gearsets, at least eight rotary shafts, as well as five shifting elements, which, by selective engagement, produce different gear ratios between the drive shaft and output shaft, so that eight forward gears and at least one reverse gear can be implemented.

BACKGROUND OF THE INVENTION

According to the state of the art, automatic transmissions, particularly for motor vehicles, comprise planetary gearsets, which are shifted using friction and/or shifting elements, such as clutches and brakes, and which are typically connected to a start element that is exposed to a slip effect and optionally provided with a lock-up clutch, for example, a hydrodynamic torque converter or a fluid clutch.

Within the scope of the Applicant's DE 101 15 983 A1, a multi-speed transmission is described, for example, with a drive shaft that is connected to a front-mounted gearset, an output shaft that is connected to a rear-mounted gearset, and a maximum of seven shifting elements, via whose selective engagement at least seven forward gears can be shifted without range shifts. The front-mounted gearset is formed by a shiftable or non-shiftable planetary gearset or a maximum of two non-shiftable front-mounted planetary gearsets connected to one another. The rear-mounted gearset is configured as a two-carrier/four-shaft transmission with two shiftable planetary gearsets and having four free shafts. The first free shaft of this two-carrier/four-shaft transmission is connected to the first shifting element, the second free shaft to the second and third shifting elements, the third free shaft to the fourth and fifth shifting elements and the fourth free shaft is connected to the output shaft. According to the invention, a multi-speed transmission with a total of six shifting elements is proposed, which additionally connects the third free shaft or the first free shaft of the rear-mounted gearset with a sixth shifting element. For a multi-speed transmission with a total of seven shifting elements, it is proposed according to the invention that the third free shaft be additionally connected to a sixth shifting element and the first free shaft additionally to a seventh shifting element.

Several further multi-speed transmissions are also known, by way of example, from the Applicant's DE 101 15 995 A1, where four shiftable planetary gearsets coupled to one another and six or seven shifting elements engaged to one another are provided, via whose selective closure a rotational speed of a drive shaft of the gearbox can be transmitted to an output shaft of the gearbox in a way that nine or eleven forward gears and at least one reverse gear can be shifted. Depending on the gear diagram, two or three shifting elements are closed in each gear, where, by changing from one gear to the, in each case, next higher or lower gear, only one engaged shifting element is disengaged at a time and a previously disengaged shifting element is engaged, to avoid range shifts.

Furthermore, in an undisclosed patent application in conformity with its kind, DE 10 2005 002 337.1 by the Applicant, a multi-speed transmission with one drive shaft, one output shaft, four individual planetary gearsets coupled to one another and five shifting elements is proposed, where eight forward gears can be shifted into without any range shifts, i.e., in a way that by changing from a forward gear to the next higher or lower forward gear only one of the previously engaged shifting elements is disengaged and only one of the previously disengaged shifting elements is engaged at a time. The multi-speed transmission also shows a reverse gear. In all forward gears and the reverse gear, three shifting elements are engaged at a time. With respect to the kinematic coupling of the four planetary gearsets with one another and with the drive shaft and output shaft, it is provided that one carrier of the fourth planetary gearset and the drive shaft are connected to one another and form the first shaft of the gearbox, one carrier of the third planetary gearset and the output shaft are connected to one another and form a second shaft of the gearbox, one sun gear of the first planetary gearset and one sun gear of the fourth planetary gearset are connected to one another and form a third shaft of the gearbox, one ring gear of the first planetary gearset forms a fourth shaft of the gearbox, one ring gear of the second planetary gearset and one sun gear of the third planetary gearset are connected to one another and form a fifth shaft of the gearbox, one carrier of the first planetary gearset and one ring gear of the third planetary gearset are connected to one another and form a sixth shaft of the gearbox, one sun gear of the second planetary gearset and one ring gear of the fourth planetary gearset are connected to one another and form a seventh shaft of the gearbox and one carrier of the second planetary gearset forms an eighth shaft of the gearbox. With respect to the kinematic coupling of the five shifting elements with the four planetary gearsets and drive shaft and output shaft, it is provided that the first shifting element is arranged in the power flow between the third shaft and a gearbox housing, the second shifting element in the power flow between the fourth shaft and the gearbox housing, the third shifting element in the power flow between the first and fifth shaft, the fourth shifting element either between the eighth and second shaft or between the eighth and sixth shaft, as well as the fifth shifting element either between the seventh and fifth shaft, or between the seventh and eighth, or between the fifth and eighth shaft.

Automatic shiftable vehicle transmissions in planetary design have in general been described from the state of the art on many occasions, and are subject to continuous development and improvements. These transmissions should feature a sufficient number of forward gears as well as one reverse gear and excellently suitable gear ratios for motor vehicles, with a high overall spread as well as favorable steps. Furthermore, they should allow a high start gear ratio in the forward direction and include a direct gear, and additionally be suited for use in both in passenger cars and commercial vehicles. In addition, these transmissions should require low manufacturing expenditure, in particular a small number of shifting elements, and avoid double shifts during sequential gear shifts, so that only one element at a time is shifted with shifts in a defined gear group.

The object of the present invention is to propose a multi-speed transmission of the type mentioned above with at least eight shiftable forward gears free of range shifts and at least one reverse gear, where by using a total of four planetary gearsets, a preferably small number of shifting elements are required. In addition, the gearbox should feature a large ratio spread at comparably harmonic gear shifting, showing a favorable degree of efficiency, i.e., comparatively low drag and gearing losses—in the main driving gears at least.

SUMMARY OF THE INVENTION

The multi-speed transmission in planetary design according to the present invention is based on the gear diagram of the patent application in conformity with its kind DE 10 2005 002 337 by the Applicant, and features one drive shaft, one output shaft, four individual planetary gearsets coupled to one another, at least eight rotary shafts and five shifting elements (two brakes and three clutches), where selective engagement produces different transmission ratios between the drive shaft and output shaft, so that eight forward gears and one reverse gear can be implemented. In each gear, three of the five shifting elements are engaged respectively, in such a way that by changing from a forward gear to the next higher or lower forward gear only one of the previously engaged shifting elements is disengaged and only one of the previously disengaged shifting elements is engaged at a time.

According to the invention, the following is proposed:
one carrier of the fourth planetary gearset and the drive shaft are constantly connected to one another and form the first shaft of the gearbox;
one ring gear of the second planetary gearset, one carrier of the third planetary gearset and the output shaft are constantly connected to one another and form the second shaft of the gearbox;
one sun gear of the first planetary gearset and one sun gear of the fourth planetary gearset are constantly connected to one another and form the third shaft of the gearbox;
one carrier of the first planetary gearset forms the fourth shaft of the gearbox;
one sun gear of the third planetary gear shaft forms the fifth shaft of the gearbox;
one ring gear of the first planetary gearset and one carrier of the second planetary gearset and one ring gear of the third planetary gearset are constantly connected to one another and form the sixth shaft of the gearbox;
one ring gear of the fourth planetary gearset forms the seventh shaft of the gearbox;
one sun gear of the second planetary gear shaft forms the eighth shaft of the gearbox;
the first shifting element is arranged in the power flow between the third shaft and a gearbox housing;
the second shifting element is arranged in the power flow between the fourth shaft and the gearbox housing;
the third shifting element is arranged in the power flow between the first and fifth shaft of the gearbox;
the fourth shifting element is arranged in the power flow between the seventh and eighth shaft of the gearbox, and
the fifth shifting element is arranged in the power flow between the fifth and seventh shaft of the gearbox.

The multi-speed transmission according to the present invention differs from the multi-speed transmission in conformity with its kind according to DE 10 2005 002 337.1, in that henceforth; the second shaft of the gearbox is also constantly connected to the ring gear of the second planetary gearset; the fourth shaft of the gearbox is formed by the carrier of the first planetary gearset; the fifth shaft of the gearbox is formed by the sun gear of the third planetary gearset; the sixth shaft of the gearbox is formed by the ring gear of the first planetary gearset and the carrier of the second planetary gearset and ring gear of the third planetary gearset; the seventh shaft of the gearbox is only formed by the ring gear of the fourth planetary gearset; the sun gear of the second planetary gearset forms the eighth shaft of the gearbox, and the fourth shifting element is arranged in the power flow between the seventh and eighth shaft of the gearbox.

As in the multi-speed transmission in conformity with its kind according to DE 10 2005 002 337.1, it also applies to the multi-speed transmission according to the present invention that the first forward gear results from engaging the first, second and third shifting element, the second forward gear from engaging the first, second and fifth shifting element, the third forward gear from engaging the second, third and fifth shifting element, the fourth forward gear from engaging the second, fourth and fifth shifting element, the fifth forward gear from engaging the second, third and fourth shifting element, the sixth forward gear from engaging the third, fourth and fifth shifting element, the seventh forward gear from engaging the first, third and fourth shifting element, the eighth forward gear from engaging the first, fourth and fifth shifting element and the reverse gear from engaging the first, second and fourth shifting element.

Three of the four planetary gearsets are executed as so-called negative planetary gearsets, whose planetary gears respectively mesh with the sun gear and ring gear of the respective planetary gearset. One of the four planetary gearsets—specifically, the first planetary gearset—is executed as a so-called positive planetary gearset with an internal and an external planetary gear meshing with one another, whereby these internal planetary gears also mesh with the sun gear of this positive planetary gearset, and whereby these external planetary gearsets also mesh with the ring gear of this plus planetary gearset. With respect to the layout of the four planetary gearsets in the gearbox housing, it is proposed in an advantageous embodiment that the four planetary gearsets be arranged co-axially to one another in a sequential order of "first, fourth, second, third planetary gearset".

The layout of the shifting elements of the multi-speed transmission according to the present invention inside the gearbox housing is in principle only limited by the dimensions and external shape of the gearbox housing. Multiple variations regarding layout and constructive embodiments of the shifting elements can be drawn, by way of example, from the patent application in conformity with its kind DE 10 2005 002 337.1.

Thus, regarding the arrangement of the shifting elements, an advantageous alternative for a standard transmission can provide, by way of example, that the first and second shifting elements are at least partially arranged spatially in an area radially above the first or fourth planetary gearsets, and that the third, fourth and fifth shifting elements are at least partially arranged spatially in an area axially between the fourth and second planetary gearsets. The third shifting element, by way of example, is directly adjacent axially on the fourth planetary gearset, whereas the fourth shifting element, in particular its disk pack, is arranged axially adjacent to the second planetary gearset, whereby the fifth shifting element can spatially at least partially be arranged in an area axially between the third shifting element and the disk pack of the fourth shifting element. However, the disk pack of the fifth shifting element can, by way of example, also spatially be at least partially arranged radially above the disk pack of the third shifting element. An advantageous constructive embodiment can also provide a common disk carrier for the fourth and fifth shifting elements, which, according to the gear diagram, is connected to the ring gear of the fourth planetary gearset. An advantageous constructive embodiment can also provide a common disk carrier for the third and fifth shifting elements, which, according to the gear diagram, is connected to the sun gear of the third planetary gearset. The first and second shifting elements can spatially at least partially be arranged axially one next to the other or at least in part radially one on top of the other.

With the embodiment of the multi-speed transmission according to the present invention, gear ratios result with a large spread pattern and harmonic gear shifting especially suitable for automobiles result. Furthermore, with the multi-speed transmission according to the present invention, the reduced amount of shifting elements, namely two brakes and three clutches, the design and construction costs are comparatively low. In addition, in the multi-speed transmission according to the present invention, a favorable degree of efficiency is achieved in all gears, on the one hand as a consequence of low drag losses, since in each gear only one shifting element is respectively changed, and on the other hand also because of the low gearing losses in the individual planetary gearsets constructed in a simple way.

Furthermore, with the multi-speed transmission according to the present invention, starting with a hydrodynamic converter, an external start clutch or also other adequate external start elements is advantageously possible. It is also conceivable to allow the start procedure via a start element integrated in the gearbox. One of the two brakes, which is actuated in the first and second forward gears and reverse gear, is preferably suitable for this purpose.

In addition, the multi-speed transmission according to the present invention is designed such that it is adaptable to different power train embodiments, both in the direction of power flow as well as from the spatial perspective. Hence, by way of example, the power input and power output can optionally be arranged co-axially or axially parallel to one another in the gearbox.

For an application with the drive shaft and the output shaft co-axial to one another, by way of example, it is convenient that the first planetary gearset is the planetary gearset of the group of planetary gearsets according to the present invention facing the power gearbox transmission. Depending on the layout of the five shifting elements inside the gearbox housing, it can be provided that all four planetary gearsets are each advantageously penetrated centrically in axial direction by not more than one gearbox shaft. Thus, in connection with an arrangement of the shifting elements, wherein the four planet gearsets elements are consecutively arranged co-axially to one another in the sequential order of "first, fourth, second, third planetary gearset", the first and second shifting elements are arranged radially in the area near the power transmission above the first and fourth planetary gearsets, and wherein the third, fourth and fifth shifting elements are at least partially arranged in an area axially between the fourth and second planetary gearset, the first and fourth planetary gearsets are only centrically penetrated in axial direction by the first gearbox shaft, whereas the second planetary gearset is only pentrated centrically in axial direction by the fifth gearbox shaft, and the third planetary gearset should not be penetrated centrically by any gearbox shaft. Correspondingly simple is the constructive embodiment of the pressurizing medium and lubricant supply to the servomechanisms of the individual shifting elements.

For an application with the drive shaft and the output shaft axially parallel or at an angle to one another, the first or third planetary gearset can be arranged on the side of the gearbox housing facing the functionally connected drive motor of the transmission. If the first planetary gearset faces the gearbox drive, it can be provided that—as in the co-axial arrangement of the drive shaft and output shaft-depending on the spatial arrangement of the five shifting elements inside the gearbox housing—that all four planetary gearsets are penetrated centrically in axial direction by not more than one gear shaft each: the first and fourth planetary gearset only by the first gear shaft, the second planetary gearset only by the fifth gear shaft.

If, on the contrary, the third planetary gearset faces the gearbox drive with respect to the non-co-axial arrangement of the drive shaft and output shaft, the first and fourth planetary gearset should not be penetrated centrically by any gear shaft in axial direction.

With respect to the above-mentioned axial arrangement of the third, fourth and fifth shifting elements between the second and fourth planetary gearset, for example, the second planetary gearset is penetrated centrically in axial direction by the fifth gear shaft as well as first gear shaft, which runs in sections in a centrical way inside this fifth shaft, whereas the third planetary gearset is only penetrated centrically in axial direction by the first shaft.

In all cases, the third gear shaft, which in sections is formed by the sun gears of the first and fourth planetary gearsets, can be mounted twistable on a hub arranged fast on the gearbox housing. If the first planetary gearset faces the gearbox drive, way hub arranged fast on the gearbox housing is part of the wall of the gearbox housing on the drive side, otherwise, part of the wall of the gearbox housing opposing the drive motor.

BRIEF DESCRIPTION OF THE DRAWINGS

The invention will now be described, by way of example, with reference to the accompanying drawings in which:

FIG. 2 is an exemplary shifting diagram for the multi-speed transmission according to FIG. 1;

DETAILED DESCRIPTION OF THE INVENTION

Figure 1:
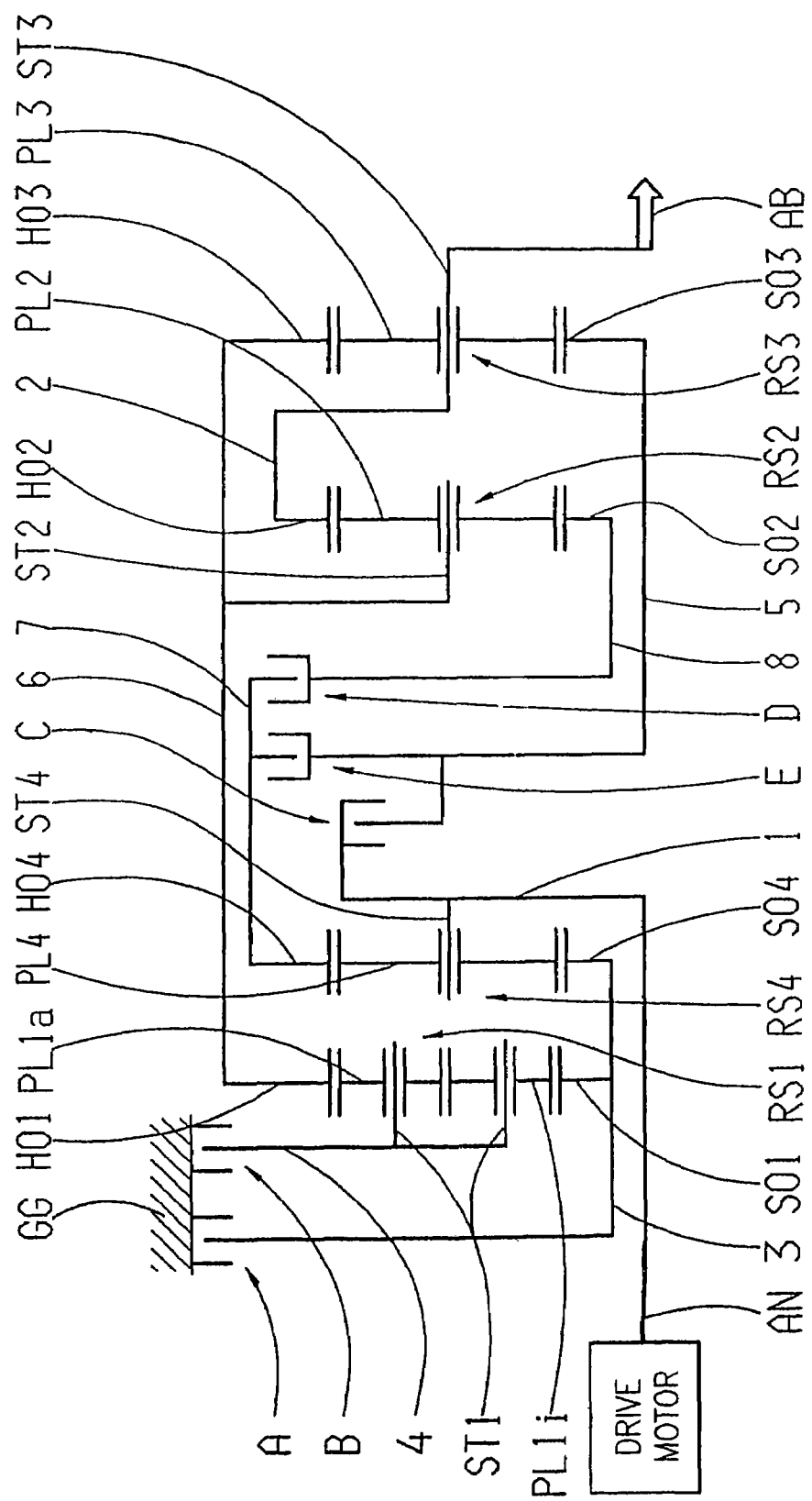
FIG. 1 is a schematic view of an exemplary embodiment for a multi-speed transmission according to the present invention.

FIG. 1 shows now a schematic view of an exemplary embodiment for a multi-speed transmission. The transmission comprises one drive shaft AN and one output shaft AB, as well as planetary gearsets RS1, RS2, RS3, RS4 and five shifting elements A, B, C, D, E, which are all arranged in one gearbox housing GG. In this exemplary embodiment, the four planetary gearsets RS1, RS2, RS3, RS4 are arranged co-axially one after the other in axial direction in the sequential order of "RS1, RS4, RS2, RS3". The planetary gearsets RS2, RS3 and RS4 are constructed as simple negative planetary gearsets. As is generally known, a negative planetary gearset features planetary gears, which mesh with the sun gear and ring gear of this planetary set. The ring gears of the planetary gearsets RS2, RS3, RS4 are designated as HO2, HO3 and HO4, the sun gears as SO2, SO3 and SO4, the planetary gears as PL2, PL3 and PL4, and the carriers on which the planetary gears are rotabably mounted as ST2, ST3 and ST4. The planetary gearset RS1 is constructed as a simple positive planetary gearset in double planetary design. As is generally known, a positive planetary gearset feature internal and external planetary gears meshing with one another, whereby these internal planetary gears also mesh with the sun gear of this external planetary set, and whereby these external planetary gears also mesh with the ring gear of this planetary set. The ring gear of the planetary gearset RS1 is designated as HO1, the sun gear as SO1, the internal planetary gears as PL1$i$, the external planetary gears as PL1$a$, the carrier, on which the external and external planetary gears PL1$i$, PL1$a$ are rotatably mounted, as ST1. The shifting elements A and B are constructed as brakes, which in the depicted exemplary embodiment can both be executed as interlocking shiftable disk brakes, of course, in another embodiment also as a interlocking shiftable band brake or also, by way of example, as a positive locking shiftable claw or cone brake. The shifting elements C, D and E are constructed as clutches, which in the exemplary embodiment can all be executed as interlocking shiftable disk clutches, of course, in another embodiment, by way of example, also as positive locking claw or cone clutches. With these five shifting elements A to E, selective shifting of eight forward gears and at least one reverse gear can be implemented. The multi-speed transmission according to the present invention shows a total of at least eight rotary shafts, which are designated with 1 to 8.

With respect to the kinematic coupling of the individual elements of the four planetary gearsets RS1, RS2, RS3, RS4 among them and with the drive shaft and output shaft AN, AB, the following is provided: The carrier ST4 of the fourth planetary gearset RS4 and drive shaft AN are connected constantly to one another and form the shaft 1. The ring gear HO2 of the second planetary gearset RS2, the carrier ST3 of the third planetary gearset RS3 and the output shaft AB are connected constantly to one another and form the shaft 2. The sun gears SO1, SO4 of the first and fourth planetary gearset RS1, RS4 are connected constantly to one another and form the shaft 3. The coupled carrier ST1 of the first planetary gearset RS1 forms the shaft 4. The sun gear SO3 of the third planetary gearset RS3 forms the shaft 5. The ring gear HO1 of the first planetary gearset RS1, the carrier ST2 of the second planetary gearset RS2 and the ring gear HO3 of the third planetary gearset RS3 are connected constantly to one another and form the shaft 6. The ring gear HO4 of the fourth planetary gearset RS4 forms the shaft 7. The sun gear SO2 of the second planetary gearset RS2 forms the shaft 8.

With respect to the kinematic coupling of the five shifting elements A to E with the described transmission shafts 1 to 8, the following is provided in the multi-speed transmission according to FIG. 1: The brake A is arranged as a first shifting element in the power flow between the shaft 3 and a gearbox housing GG. The brake B is arranged as a second shifting element in the power flow between the shaft 4 and the housing GG. The clutch C is arranged as a third shifting element in the force flow between the shaft 1 and shaft 5. The clutch D is arranged as a fourth shifting element in the power flow between the shaft 7 and shaft 8. The clutch E is arranged as a fifth shifting element in the power flow between the shaft 5 and shaft 7.

Figure 3:
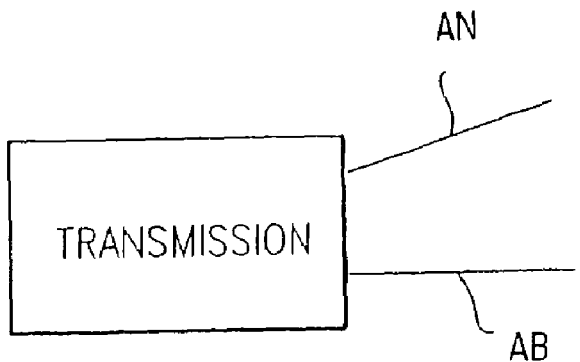
FIG. 3 is a schematic view of the multi-speed transmission according to FIG. 1 with a drive shaft at an angle to an output shaft.

In the exemplary embodiment depicted in FIG. 1, the first planetary gearset RS1 is the gearset next to the input of the gearbox and the third planetary gearset RS3 is the gearset next to the output of the gearbox, where, by way of example, the drive shaft AN and output shaft AB are arranged co-axial to one another. It would be apparent to a person skilled in the art that this transmission could be modified without special expenditures so that the drive shaft AN and output shaft AB are no longer arranged co-axial to one another, but, for example, axially parallel or at an angle to one another, as seen in FIG. 3. With an arrangement of this type, the person skilled in the art would also, if necessary, be able to arrange the input of the gearbox next to the third planetary gearset RS3, namely on the side of the third planetary gearset RS3 facing away from the first planetary gearset RS1.

In principle, the layout of the shifting elements of the exemplary embodiment of a multi-speed transmission according to the present invention depicted in FIG. 1 can be arbitrary inside the gearbox and is only limited by the dimensions and external shape of the gearbox housing GG.

In the exemplary embodiment depicted in FIG. 1, viewed spatially, both brakes A, B are arranged axially one next to the other in the area of the first planetary gearset RS1 next to the power drive, whereby the kinematic connection of both brakes A, B to the first planetary gearset RS1 determines that the brake B is arranged closer to the fourth planetary gearset RS4 adjacent to the first planetary gearset RS1 than the brake A, and that the brake A is respectively arranged closer to the input of the gearbox than the brake B. Viewed spatially, the brake B is at least partially arranged radially in an area above the first planetary gearset RS1, and the brake A is respectively arranged on the side of the first planetary gearset RS1 (next to the input) facing away from the fourth planetary gearset RS4. An internal disk carrier of the brake A forms a section of the gearbox shaft 3 and is rotationally fixed with the sun gear SO1 on the side of the first planetary gearset RS1 facing away from the fourth planetary gearset RS4. The shaft 3 is executed in sections as a type of sun shaft that connects the sun gears SO1, SO4 of the planetary gearsets RS1, RS4 with one another. Thus, the shaft 3 can be rotationally mounted on the drive shaft AN as well as on a hub (not depicted in detail in FIG. 1) arranged fast on the gearbox housing. An internal disk carrier of the brake B forms a section of the gearbox shaft 4 and is rotationally fixed to the coupled carrier ST1 of the first planetary gearset ST1. The servomechanisms required for the operation of the friction elements of both brakes A, B are not depicted in detail in FIG. 1 for the sake of simplicity, and can, by way of example, be integrated in the gearbox housing GG or a case cover arranged fast on the gearbox housing or respectively be mounted axially slidable.

The person skilled in the art would be able to modify this exemplary layout of both brakes A, B, if required, without special inventive effort. Thus, the brake A can be arranged, by way of example, at least in part radially above the first planetary gearset RS1 and the brake B at least in part radially above the fourth planetary gearset RS4. In a still further embodiment, by way of example, both brakes A, B can also be arranged bordering axially one on top of the other on the side of the first planetary gearset RS1 facing away from the planetary gearset RS4, whereby the brake B is then arranged, for example, on a larger diameter than the brake A.

Furthermore, as is apparent from FIG. 1, viewed spatially, all three clutches C, D, E are arranged at least in part axially in an area between the fourth and second planetary gearset RS4, RS2, whereby the required servomechanism for the operation of the respective disk packs of the clutches C, D, E is not depicted in detail in FIG. 1.

The clutch C is directly axially adjacent the fourth planetary gearset RS4. Thus, an external disk carrier of the clutch C is rotationally fixed to the carrier ST4 of the fourth planetary gearset RS4 and the drive shaft AN on the side of the disk pack for clutch C facing the fourth planetary gearset RS4, and can hence also be designated as a section of the gearbox shaft 1. An internal disk carrier of the clutch C is rotationally fixed to the sun gear SO3 of the third planetary gearset RS3, and hence can also be designated as a section of the gearbox shaft 5. The servomechanism required for the operation of the disk pack of the clutch C can, by way of example, be arranged inside the cylinder space, which is formed by the external disk carrier of the clutch C, can be mounted axially slidable on this external disk carrier of the clutch C and constantly rotate at the revolution speed of the shaft 1 or the drive shaft. In order to compensate for the rotational pressure of the rotating pressure chamber of this servomechanism, the clutch C can feature a generally known dynamic pressure equalizer.

Furthermore, as is apparent from FIG. 1, the clutch D—at least the disk pack of the clutch D—is arranged adjacent to the second planetary gearset RS2. Here an internal disk carrier of the clutch D is rotationally fixed with the sun gear SO2 of the second planetary gearset RS2, and can thus also be designated as a section of the gearbox shaft 8. An external disk carrier of the clutch D is arranged torsion resistant with the ring gear HO4 of the fourth planetary gearset RS4 and can thus also be designated as a section of the gearbox shaft 7. Shaft 7 completely overlaps the clutch C in its axial course. The servomechanism required for the operation of the disk pack of clutch D can, by way of example, be mounted axially slidable on the internal disk carrier of the clutch D and rotate constantly at the revolution speed of the shaft 8, however, by way of example, can also be mounted axially slidable on the external disk carrier and rotate constantly at the revolution speed of the shaft 7. In order to compensate for the rotational pressure of the rotating pressure chamber of this servomechanism, the clutch D can feature a generally known dynamic pressure equalizer.

Furthermore, as is apparent from FIG. 1, viewed spatially, at least the disk pack of the clutch E is arranged axially in an area between the disk pack of the clutch C and the disk pack of the clutch D. An internal disk carrier of the clutch E—as also the internal disk carrier of the clutch C—is connected torsion resistant with the sun gear SO3 of the third planetary gearset RS3, and can thus also be designated as a section of the gearbox shaft 5. Hereby, in terms of construction, a common disk carrier can be advantageously provided for the clutches C and E. An external disk carrier of the clutch E is—as also the external disk carrier of the clutch D—connected torsion resistant with the ring gear HO4 of the fourth planetary gearset RS4 and can hence be likewise designated as a section of the transmission shaft 7. Hereby, in terms of construction, a common disk carrier can be advantageously provided for the clutches D and E. The servomechanism required for the operation of the disk pack of the clutch E can, by way of example, be mounted axially slidable on the internal disk carrier of the clutch E and rotate constantly at the revolution speed of the shaft 5, however, can also be mounted axially slidable on the external disk carrier of the clutch E and rotate constantly at the revolution speed of the shaft 7. Like the servomechanisms of the clutches C and D, the servomechanism of the clutch E can also feature a dynamic pressure equalizer.

According to the gearset diagram, according to the sequential order of "RS1, RS4, RS2, RS3" of the four planetary gearsets RS1, RS2, RS3, RS4 and according to the axial arrangement of the three clutches C, D, E in an area between the first and second planetary gearsets RS1, RS2, the gearbox shaft 6 completely overlaps the fourth planetary gearset RS4, the three clutches C, D, E as well as the second planetary gearset RS2 in axial direction over its course.

It should expressly be pointed out that the arrangement of the three clutches C, D, E described above should only be viewed as examples. If necessary, a person skilled in the art could modify this exemplary layout of the three clutches C, D, E; numerous suggestions for this purpose can be drawn, for example, from the patent application in conformity with its kind DE 10 2005 002 337.1. In this regard, without basically modifying the component parts of the transmission depicted in FIG. 1, it can be provided, by way of example, that, viewed spatially, the disk pack of the clutch E is at least partially arranged radially above the disk pack of the clutch C, namely that, viewed spatially, the clutch E is at least arranged in part radially above the clutch C.

FIG. 2 depicts a shifting diagram of the multi-speed transmission according to the present invention as illustrated in FIG. 1. Three shifting elements are engaged and two shifting elements are disengaged in each gear. Besides the shifting logic, exemplary values for the respective ratios i of the individual gears and the steps φ to be determined as a result can be gathered. The indicated ratios i result from the (typical) ratios of standard transmissions of the four planetary gearsets RS1, RS2, RS3, RS4 of plus 3.50, minus 3.70, minus 3.40 and minus 2.70. Further, the shifting diagram also shows that, on sequential shifting, double shifts and/or range shifts are avoided, because two gears adjacent in the shifting logic use two shifting elements conjointly. The sixth gear is executed as direct gear.

The first forward gear results from closing the brakes A and B and clutch C, the second forward gear from engaging the brakes A and B and clutch E, the third forward gear from engaging the brake B and clutches C and E, the fourth forward gear from engaging the brake B and clutches D and E, the fifth forward gear from engaging the brake B and clutches C and D, the sixth forward gear from engaging clutches C, D and E, the seventh forward gear from engaging the brake A and clutches C and D, and the eighth forward gear from engaging the brake A and clutches D and E. As further apparent from the shifting diagram, the reverse gear results from engaging the brake A and B and clutch D.

According to the present invention, start of the vehicle is possible via a shifting element integrated in the gearbox. For this purpose, a shifting element is particularly suitable that is required in the first forward gear as well as in the reverse gear, that is, preferably brake A or brake B. Both of these brakes A, B are advantageously also required in the second forward gear. If the brake B is used as a start element integrated in the gearbox, start is even possible in the first five forward gears and reverse gear. As apparent from the shifting diagram, the clutch C can also be used to start in forward direction and the clutch D can be used as a start element internal to the transmission.

In addition, the following applies to the exemplary embodiment of the multi-speed transmission according to the present invention depicted and described above.

According to the present invention, depending on the standard transmission ratio of the individual planetary sets, different gear transitions can be obtained with the same shifting diagram, allowing custom-designed and/or vehicle-specific variations.

Figure 4:
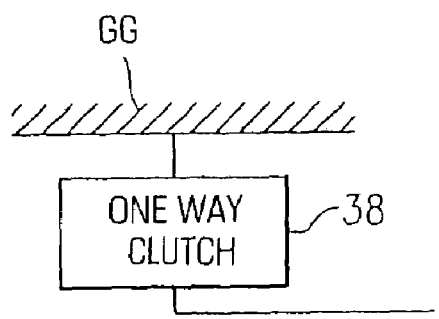
FIG. 4 is a schematic view of the multi-speed transmission according to FIG. 1 with a one-way clutch located between a shaft and a transmission housing.

It is also possible, as seen in FIG. 4, to provide additional one-way clutches 38 at each suitable point of the multi-speed transmission, by way of example, between a shaft and housing GG or, if necessary, to connect two shafts.

Figure 6:
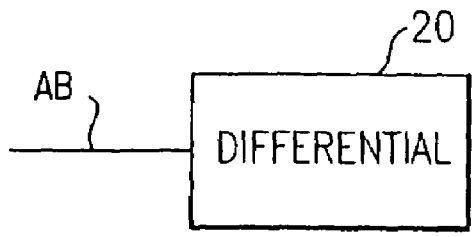
FIG. 6 is a schematic view of the multi-speed transmission according to FIG. 1 with a differential located on the output shaft.

A differential and/or transfer differential 20 can be arranged on the input or output side, as seen in FIG. 6.

Figure 7:
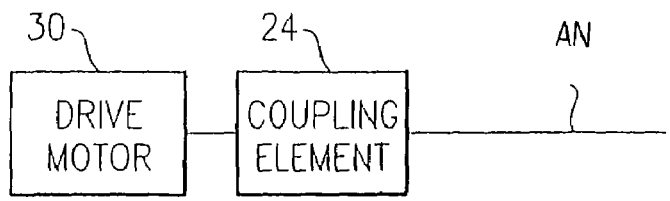
FIG. 7 is a schematic view of the multi-speed transmission according to FIG. 1 with a coupling element located between the drive shaft and a drive motor.
Figure 8:
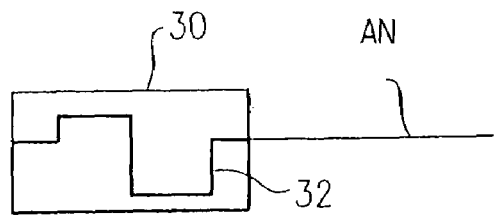
FIG. 8 is a schematic view of the multi-speed transmission according to FIG. 1 with the drive shaft fixed to a crankshaft of the drive motor.

In line with an advantageous improvement, as seen in FIG. 7, the drive shaft AN can be separated from a drive motor 30 by a coupling element 24, if required, whereby a hydrodynamic converter, hydraulic clutch, dry start clutch, wet start clutch, magnetic powder clutch or centrifugal clutch can be used as such a coupling element. A drive element of this type can also be arranged behind the gearbox in the direction of power flow, whereby the drive shaft AN is connected constantly to the crankshaft 32 of the drive motor 30, as seen in FIG. 8.

The multi-speed transmission according to the present invention also makes possible the arrangement of a torsion vibration damper between the drive motor and transmission.

Figure 5:
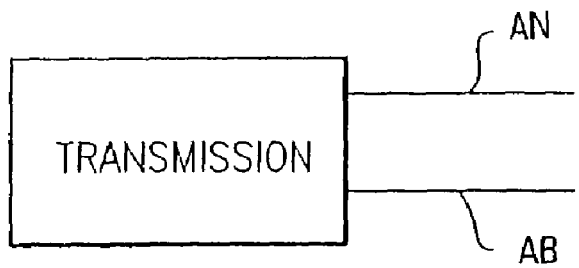
FIG. 5 is a schematic view of the multi-speed transmission according to FIG. 1 with the drive shaft and the output shaft located on a common side of the transmission housing.
Figure 9:
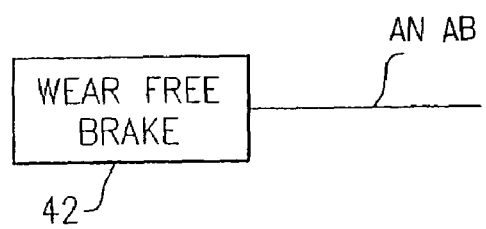
FIG. 9 is a schematic view of the multi-speed transmission according to FIG. 1 with a wear free brake located on the input shaft or the output shaft.
Figure 10:
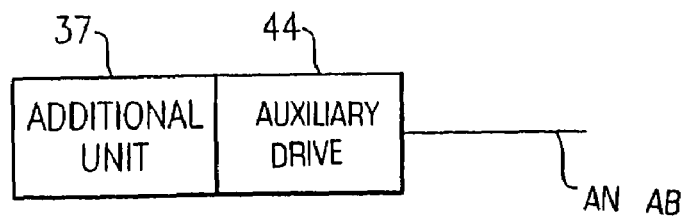
FIG. 10 is a schematic view of the multi-speed transmission according to FIG. 1 with an auxiliary drive located on the input shaft or the output shaft which drives an additional unit.

In line with another embodiment of the present invention, as seen in FIG. 9, a wear-free brake 42, e.g., a hydraulic or electric retarder or a similar device, can be arranged on each shaft, advantageously the drive shaft AN or output shaft AB, which is particularly important for use in commercial vehicles. Moreover, as seen in FIG. 10, an auxiliary drive 44 can be installed to drive additional units 37 on each shaft, preferably on the drive shaft AN or output shaft AB. As seen in FIG. 5 the drive shaft and the output shaft can be located on a common side of the transmission housing.

The shifting elements used can be executed as power-shift clutches or brakes. In particular, interlocking clutches or brakes, e.g., disk clutches, band brakes and/or cone clutches can be used. Additionally, positive locking brakes and/or clutches, e.g., synchronizations or claw clutches may also be used as shifting elements.

Figure 11:
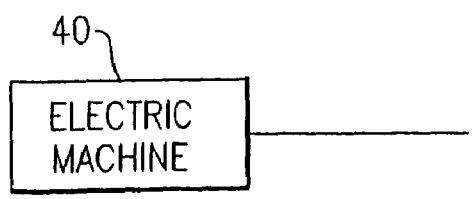
FIG. 11 is a schematic view of the multi-speed transmission according to FIG. 1 with an electric machine coupled to a shaft.

A further advantage of the present multi-speed transmission, as seen in FIG. 11, is that an electric machine 40 can additionally be installed on each shaft as a generator and/or additional drive machine.

Of course, any constructive embodiment, particularly any spatial arrangement of the planetary sets and the shifting elements as such, as well as in relation to each other, to the extent they are technically expedient, falls under the scope of protection of the present claims, without influencing the function of the transmission as described in the claims, even if these embodiments are not explicitly illustrated in the Figures or mentioned in the description.

REFERENCE NUMERALS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN drive shaft
GG housing
RS1 first planetary gearset
HO1 ring gear of the first planetary gearset
SO1 sun gear of the first planetary gearset
ST1 carrier of the first planetary gearset
PL1a external planetary gears of the second planetary gearset
PL1i internal planetary gears of the second planetary gearset
RS2 second planetary gearset
HO2 ring gear of the second planetary gearset
SO2 sun gear of the second planetary gearset
ST2 carrier of the second planetary gearset
PL2 planetary gears of the second planetary gearset
RS3 third planetary gearset
HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4 planetary gears of the fourth planetary gearset
i ratio
φ step

The invention claimed is:

1. A multi-speed automatic transmission of a planetary design for a motor vehicle, the transmission comprising:
a drive shaft (AN) and an output shaft (AB);
first, second, third, and fourth planetary gearsets (RS1, RS2, RS3, RS4), and each of the first, the second, the third, and the fourth planetary gearsets (RS1, RS2, RS3, RS4) comprises a sun gear, a carrier and a ring gear;
at least first, second, third, fourth, fifth, sixth, seventh, and eighth rotatable shafts (1, 2, 3, 4, 5, 6, 7, 8) and first, second, third, fourth and fifth shifting elements (A, B, C, D, E) whose selective engagement creates different gear ratios between the drive shaft (AN) and the output shaft (AB) so that eight forward gears and a reverse gear can be implemented;
wherein the carrier (ST4) of the fourth planetary gearset (RS4) and the drive shaft (AN) are coupled with one another and form the first shaft (1);
the sun gear (SO1) of the first planetary gearset (RS1) and the sun gear (SO4) of the fourth planetary gearset (RS4) are coupled with one another and form the third shaft (3);
the ring gear (HO2) of the second planetary gearset (RS2), the carrier (ST3) of the third planetary gearset (RS3) and the output shaft (AB) are coupled with one another and form the second shaft (2);
the carrier (ST1) of the first planetary gearset (RS1) forms the fourth shaft (4);
the sun gear (SO3) of the third planetary gear shaft (RS3) forms the fifth shaft (5);
the ring gear (HO1) of the first planetary gearset (RS1), the carrier (ST2) of the second planetary gearset (RS2) and the ring gear (HO3) of the third planetary gearset (RS3) are coupled with one another and form the sixth shaft (6);
the ring gear (HO4) of the fourth planetary gearset (RS4) forms the seventh shaft (7);
the sun gear (SO2) of the second planetary gearset (RS2) forms the eighth shaft (8);
the first shifting element (A) is located between the third shaft (3) and a gearbox housing (GG);
the second shifting element (B) is located between the fourth shaft (4) and the gearbox housing (GG);

the third shifting element (C) is located, in a direction of power flow, between the first shaft (1) and the fifth shaft (5);

the fourth shifting element (D) is located, in the direction of power flow, between the seventh (7) shaft and the eighth shaft (8); and the fifth shifting element (E) is located, in the direction of power flow, between the fifth shaft (5) and the seventh shaft (7).

2. The multi-speed transmission according to claim 1, wherein a first forward gear is achieved by engagement of the first, the second and the third shifting elements (A, B, C);

a second forward gear is achieved by engagement of the first, the second and the fifth shifting elements (A, B, E);

a third forward gear is achieved by engagement of the second, the third and the fifth shifting elements (B, C, E);

a fourth forward gear is achieved by engagement of the second, the fourth and the fifth shifting elements (B, D, E);

a fifth forward gear is achieved by engagement of the second, the third and the fourth shifting element (B, C, D);

a sixth forward gear is achieved by engagement of the third, the fourth and the fifth shifting elements (C, D, E);

a seventh forward gear is achieved by engagement of the first, the third and the fourth shifting elements (A, C, D);

an eighth forward gear is achieved by engagement of the first, the fourth and the fifth shifting elements (A, D, E); and the reverse gear is achieved by engagement of the first, the second and the fourth shifting elements (A, B, D).

3. The multi-speed transmission according to claim 1, wherein the second, the third and the fourth planetary gearsets (RS2, RS3, RS4) are negative planetary gearsets and the first planetary gearset (RS1) is a positive planetary gearset.

4. The multi-speed transmission according to claim 1, wherein the first, the second, the third and the fourth planetary gearsets (RS1, RS2, RS3, RS4) are co-axially arranged, in the direction of power flow, in the following sequential order:

the first planetary gearset (RS1), the fourth planetary gearset (RS4), the second planetary gearset (RS2) and the third planetary gearset (RS3).

5. The multi-speed transmission according to claim 1, wherein the drive shaft (AN) is one of parallel to and at an angle to the output shaft (AB), and one of the first and the third planetary gearsets (RS1, RS3) functionally communicates with the drive shaft (AN) and is located on a side of the gearbox housing (GG) adjacent a drive motor.

6. The multi-speed transmission according to claim 1, wherein the drive shaft (AN) is co-axial with the output shaft (AB), and the first planetary gearset (RS1) functionally communicates with the drive shaft (AN) and is located on a side of the gearbox housing (GG) adjacent a drive motor.

7. The multi-speed transmission according to claim 1, wherein a singe one of the first, the second, the third, the fourth, the fifth, the sixth, the seventh, and the eighth shafts (1, 2, 3, 4, 5, 6, 7, 8) is located within and coaxial to each of the first, the second, the third and the fourth planetary gearsets (RS1, RS2, RS3, RS4).

8. The multi-speed transmission according to claim 1, wherein the first shaft (1) is located within and coaxial to both the first and the fourth planetary gearsets (RS1, RS4), and the fifth shaft (5) is located within and coaxial to the second planetary gearset (RS2).

9. The multi-speed transmission according to claim 1, wherein the fifth shaft (5) is located within the second planetary gearset (RS2) and at least partially located within the third planetary gearset (RS3), the fifth shaft (5) and the first shaft (1) are coaxial with the second planetary gearset (RS2) and the third planetary gearset (RS3).

10. The multi-speed transmission according to claim 1, wherein the third shaft (3) detachably communicates with a hub fixed to the gearbox housing (GG).

11. The multi-speed transmission according to claim 1, wherein at least one of the first shifting element (A) and the second shifting element (B), when viewed radially, is at least partially located about one of the first planetary gearset (RS1) and the fourth planetary gearset (RS4).

12. The multi-speed transmission according to claim 1, wherein the first shifting element (A), when viewed in the direction of power flow, is axially adjacent the second shifting element (B), and at least one friction element of the second shifting element (B), when viewed in the direction of power flow is located closer to the fourth planetary gearset (RS4) than the first shifting element (A).

13. The multi-speed transmission according to claim 1, wherein the first shifting element (A) and the second shifting element (B), when viewed radially, are located at least partially one above the other.

14. The multi-speed transmission according to claim 1, wherein the third shifting element (C), when viewed in the direction of power flow, is at least partially located between the fourth planetary gearset (RS4) and the second planetary gearset (RS2).

15. The multi-speed transmission according to claim 1, wherein the third shifting element (C) is axially adjacent the fourth planetary gearset (RS4).

16. The multi-speed transmission according to claim 1, wherein the fourth shifting element (D), when viewed in the direction of power flow, is at least partially located between the fourth planetary gearset (RS4) and the second planetary gearset (RS2).

17. The multi-speed transmission according to claim 1, wherein a disk pack of the fourth shifting element (D) is located axially adjacent the second planetary gearset (RS2).

18. The multi-speed transmission according to claim 1, wherein the fifth shifting element (E), when viewed in the direction of power flow, is at least partially located between the fourth planetary gearset (RS4) and the second planetary gearset (RS2).

19. The multi-speed transmission according to claim 1, wherein the fifth shifting element (E), when viewed in the direction of power flow, is at least partially located between the third shifting element (C) and the fourth shifting element (D).

20. The multi-speed transmission according to claim 1, wherein a disk pack of the fifth shifting element (E), when viewed radially, is at least partially located about a disk pack of the third shifting element (C).

21. The multi-speed transmission according to claim 1, wherein the fourth shifting element (D) and the fifth shifting element (E) have a common disk carrier, which is coupled to the ring gear (HO4) of the fourth planetary gearset (RS4).

22. The multi-speed transmission according to claim 1, wherein the third shifting element (C) and the fifth shifting element (E) have a common disk carrier which is coupled to the sun gear (SO3) of the third planetary gearset (RS3).

23. The multi-speed transmission according to claim 1, wherein the fourth planetary gearset (RS4), the second planetary gearset (RS2), and the third, the fourth and the fifth shifting elements (C, D, E) are completely contained within an axial length of the sixth shaft (6).

24. The multi-speed transmission according to claim 1, wherein a one-way clutch is located between at least one of the drive shaft (AN), the output shaft (AB), the first shaft (1), the second shaft (2), the third shaft (3), the fourth shaft (4), the fifth shaft (5), the sixth shaft (6), the seventh shaft (7), and the eighth shaft (8) and the gearbox housing (GG).

25. The multi-speed transmission according to claim 1, wherein the drive shaft (AN) and the output shaft (AB) are located on opposite sides of the gearbox housing (GG).

26. The multi-speed transmission according to claim 1, wherein the drive shaft (AN) and the output shaft (AB) are located on a common side of the gearbox housing (GG).

27. The multi-speed transmission according to claim 1, wherein at least one of a differential and transfer differential is located on one of the drive shaft (AN) and the output shaft (AB).

28. The multi-speed transmission according to claim 1, wherein a coupling element is located, in the direction of power flow, between a drive motor and the drive shaft (AN).

29. The multi-speed transmission according to claim 28, wherein the coupling element is one of a hydrodynamic converter, a hydraulic clutch, a dry start clutch, a wet start clutch, a magnetic powder clutch and a centrifugal clutch.

30. The multi-speed transmission according to claim 1, wherein a driving element communicates with at least one of the first shifting element (A), the second shifting element (B), the third shifting element (C) and the fourth shifting element (D), and the drive shaft (AN) is fixed to a crankshaft of a drive motor.

31. The multi-speed transmission according to claim 30, wherein engagement of one of the first shifting element (A) and the second shifting element (B) initiates both forward movement and reverse movement of the vehicle.

32. The multi-speed transmission according to claim 1, wherein a wear free brake is located on at least one of the drive shaft (AN), the output shaft (AB), the first shaft (1), the second shaft (2), the third shaft (3), the fourth shaft (4), the fifth shaft (5), the sixth shaft (6), the seventh shaft (7), and the eighth shaft (8) drive an electrical machine, and an auxiliary drive is located on at least one of the drive shaft (AN) and the output shaft (AB) and drives an additional unit.

33. The multi-speed transmission according to claim 1, wherein each of the first, the second, the third, the fourth and the fifth shifting elements (A, B, C, D, E) are one of an interlocking clutch, an interlocking brake, a disk clutch, a band brake, a cone clutch, a positive locking clutch, a positive locking brake and a claw clutch.

* * * * *